Patented May 13, 1924.

1,493,564

UNITED STATES PATENT OFFICE.

JOHN H. QUINE, OF ROCHESTER, NEW YORK.

ANTISEPTIC.

No Drawing.    Application filed August 28, 1918.   Serial No. 251,730.

*To all whom it may concern:*

Be it known that I, JOHN H. QUINE, a citizen of the United States, residing at Rochester, in the county of Monroe and State of New York, have invented certain new and useful Improvements in Antiseptics; and I do hereby declare the following to be a full, clear, and exact description of the same.

The object of my invention is to provide an antiseptic or germicide which is powerful in action, readily soluble in ordinary solvents such as water, alcohol and ether, is odorless, colorless and which does not readily attack organic tissues such as the tissues of the body, cotton or wool. More specifically, the object of my invention is to take advantage of the powerful antiseptic properties of mercuric iodide or red iodide of mercury by combining with its unstable soluble compound with an alkaline iodide, a substance having a stable or permanent composition, and a slight alkaline or acid reaction. To these and other ends, the invention consists in certain improvements, all as will be hereinafter more fully described, the novel features being pointed out in the claims at the end of the specification.

The antiseptic and germicidal properties of certain compounds of mercury and also of certain halogens, particularly chlorine and iodine, are well known. However, a compound of mercury and iodine, known as mercuric iodide and represented by the formula $HgI_2$, is a more powerful antiseptic than any other mercurial compound and is also more powerful than iodine. This agent is known to have antiseptic properties in solutions as weak as twenty-five thousandths of one per cent. Certain of its properties, however, such as insolubility in ordinary solvents and its persistent red color, have greatly restricted its commercial use.

Mercuric iodide is readily soluble in solutions of the alkaline iodides such as potassium or sodium iodide and the resulting solutions are substantially colorless. If potassium iodide be employed as the solvent, the salt obtained by evaporation is a double iodide of potassium and mercury, known as potassio mercuric iodide, and is probably a mixture of two salts represented by the formulas $K_2HgI_2$ and $KHgI_3$. This salt is soluble, has powerful antiseptic and germicidal properties, but is deliquescent, unstable and its action as an antiseptic so powerful that it cannot readily be adjusted to commercial uses. I propose to further combine this salt with a stable compound which serves as a diluent. I have found that alkaline salts having a slight alkaline reaction such as the carbonates, bicarbonates, sesquicarbonates or borax are well suited for my purpose. Stable compounds having a slight acid reaction and having a solid or crystalline form at normal temperatures, such as boric acid, are also suitable and produce a product which is more useful for certain purposes than the alkaline salt. The products obtained by the evaporation of these solutions are more stable than potassio mercuric iodide, are white in color, readily soluble and odorless. Moreover, they are not readily decomposed by alkalis or albuminous substances.

In the preparation of these compounds, substantially equal parts of mercuric iodide and potassium or sodium iodide are dissolved in water. Ninety-eight parts of water gives good results, although more or less water may be used. The salt contained in this solution is the double salt of potassium and mercuric iodide described above, known as potassio mercuric iodide. To this solution is added a diluent in the form of a solution of a stable alkali salt such as carbonate, bibarbonate, or sesquicarbonate of sodium, borax, or a solution of a stable compound having a slight acid reaction and a solid or crystalline form at normal temperatures, such as a solution of boric acid. Two parts of the above potassio mercuric iodide solution are mixed with a substantially five per cent. solution of sodium bicarbonate or boric acid, although the exact strength of the solution is not essential to my invention, as stronger or weaker solutions may be found to give good results. I have obtained the best results by using ninety-eight parts of the five per cent solution although the exact proportion is not essential and a greater or less quantity of the solution may prove better in practice. In general the proportions should be such as to give substantially 1% of the potassio mercuric iodide in the evaporate of the solution. The mixtures thus obtained are evaporated to dryness at a low temperature, to avoid reduction of the mercuric salt. The resulting compounds possess powerful antiseptic or germicidal properties, are stable compounds, readily soluble, and when made up in solutions of proper strength can be employed wherever an antiseptic or germicide is needed. I have found that a five per cent solution of these compounds is strong enough for general use. The compound made with the alkaline diluent is preferable for general use in hospitals, laundries or domestic purposes. The compound made with the acid diluent is especially adapted for use in medicine or surgery for which purposes the alkaline compound is not so suitable. These products also have the additional advantage that they are not readily decomposed by alkalis and albuminous substances.

Having described my invention, what I claim and desire to secure by Letters Patent is:

1. An antiseptic powder consisting of the evaporate of a substantially two per cent solution of potassio mercuric iodide to which is added a substantially five per cent solution of a stable compound, having a slight alkaline reaction in sufficient quantity to form a stable soluble product.

2. An antiseptic substance consisting of substantially equal parts of mercuric iodide and an alkaline iodide, to which is added a sufficient quantity of a stable alkaline carbonate to form a stable, soluble compound.

3. An antiseptic substance consisting of equal parts of mercuric iodide and an alkaline iodide, to which is added a sufficient quantity of a substantially five per cent solution of sodium bicarbonate to form a stable, soluble compound.

4. An antiseptic substance comprising substantially one part of potassio mercuric iodide and ninety-nine parts of sodium bicarbonate.

JOHN H. QUINE.